May 9, 1961 H. R. BOHANON 2,983,213
CLIMATE CONTROL
Filed Jan. 20, 1959 3 Sheets-Sheet 1

INVENTOR
H. R. BOHANON

May 9, 1961     H. R. BOHANON     2,983,213
CLIMATE CONTROL
Filed Jan. 20, 1959     3 Sheets-Sheet 2
FIG. 3
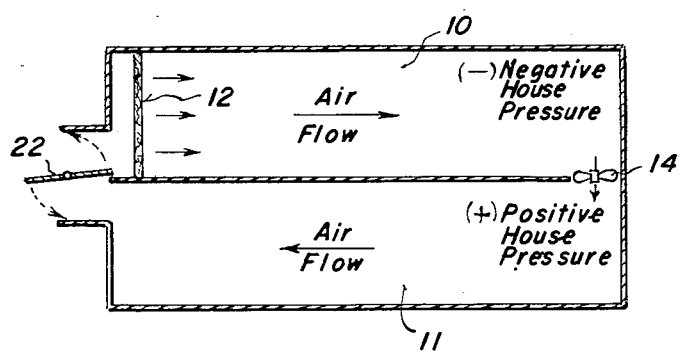
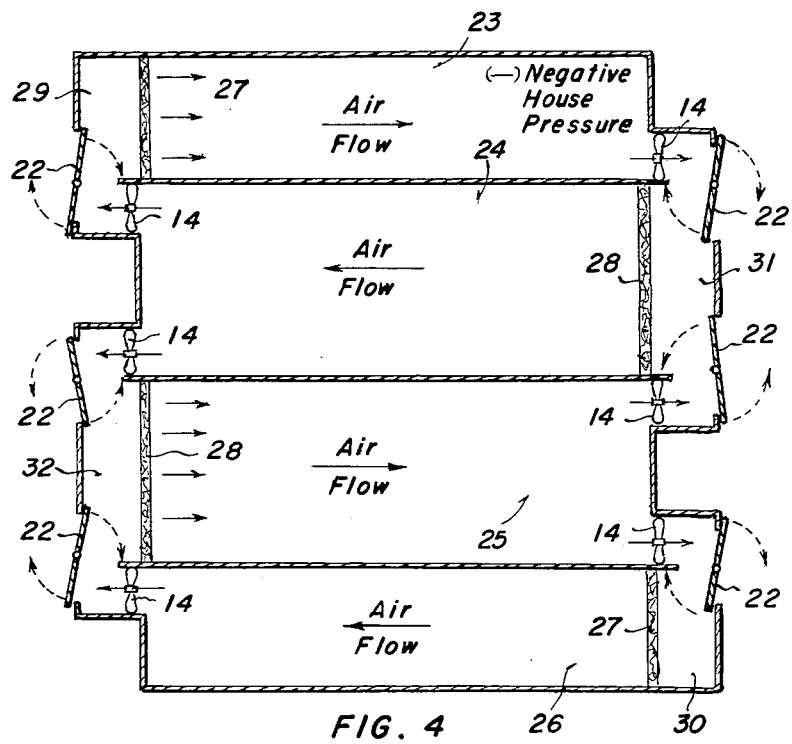
FIG. 4
INVENTOR
H. R. BOHANON

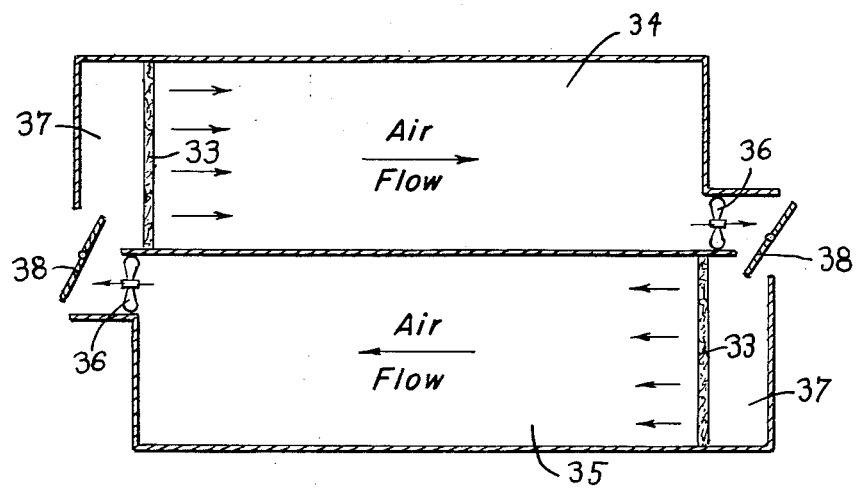

United States Patent Office 2,983,213
Patented May 9, 1961

2,983,213
CLIMATE CONTROL
Hoy R. Bohanon, 213 E. Broadway, Muskogee, Okla.
Filed Jan. 20, 1959, Ser. No. 787,892
8 Claims. (Cl. 98—33)

This invention relates to air circulating and conditioning systems for buildings or rooms containing materials, produce or plants requiring substantially constant conditions of temperature, humidity, ventilation, etc.

The object of this invention is to provide simple but effective all year conditioning means for buildings such as greenhouses, storehouses and agricultural housing such as poultry houses, dairy barns, etc.

A further object is to provide simple conditioning systems for climatic control in housing of the type mentioned in order to properly control within limits such factors as temperature, humidity, air velocity, ventilation and filtration, regardless of outside weather conditions.

A further object is to eliminate from the buildings extremes of weather conditions with respect to such factors as mentioned above, which would be harmful to the crops, animals or any materials stored in the buildings of the type mentioned.

Figure 1:
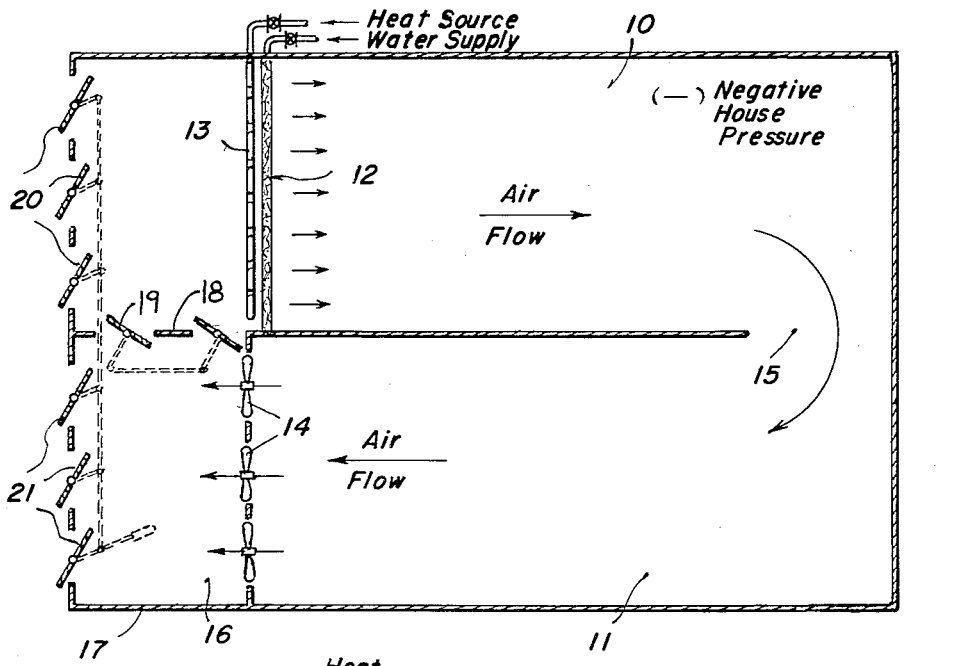
Figure 2:
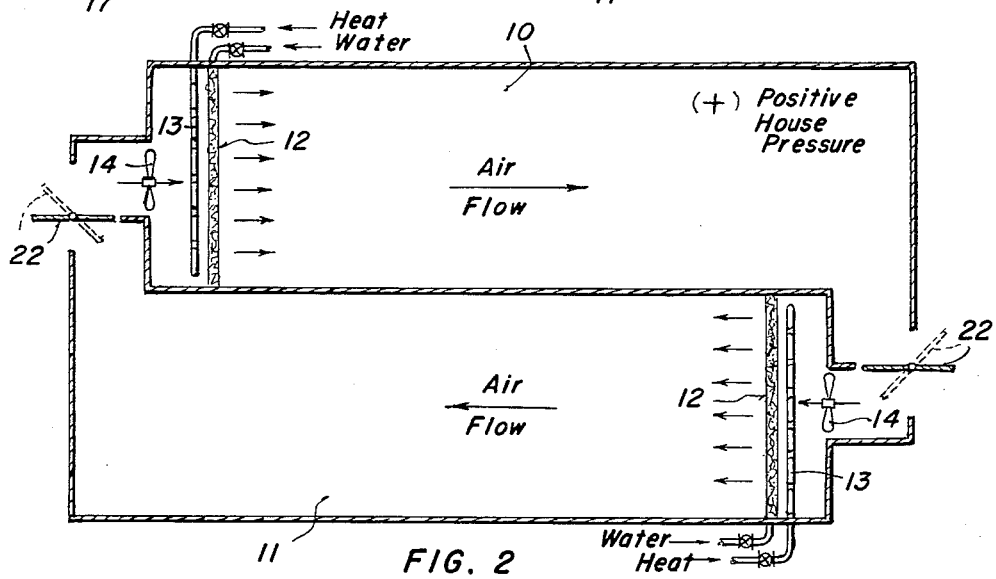

Other and more specific objects will appear in the following detailed descriptions of some forms of systems constructed in accordance with this invention and illustrated in the accompanying drawings, wherein:

Fig. 1 shows diagrammatically one arrangement of conditioning apparatus and dampers in a two-room building, where the rooms are joined at one end by an unrestricted passage, Fig. 2 similarly shows a second arrangement in a two-room building, where the rooms may be selectively connected or disconnected, at each end, Fig. 3 shows a third arrangement for two unconnected rooms, which may be selectively connected at one end, Fig. 4 shows a multi-room arrangement with external connections between adjacent rooms, at their ends, and Fig. 5 shows a two-room arrangement similar to the multi-room arrangement of Fig. 4.

The apparatus in these systems comprises fans or blowers, dampers, air valves or flaps, humidifying means and heaters. The humidifying means may also be used as cooling means when cooling is required, just as the heaters may be used as dryers when lower humidity is required.

The general arrangement is to place the blowers or fans in one of the series of connected rooms to include circulation therethrough and place a humidifying means having a heater in the flow of air caused by the blowers, and dampers for selectively controlling the air circulation between these rooms and the outside atmosphere.

The essential features common to all arrangements, in general, are the provision of a humidifying means in the air inlet end of at least one of a pair of adjacent rooms, circulation passages connecting the adjacent ends of said rooms, a blower in at least one of said passages, and damper means in at least one of said passages to control the amount of circulating air to be replaced by fresh air from the outside atmosphere.

In Fig. 1, the two rooms 10 and 11 have a humidifying screen 12 with a controlled supply of water at the inlet end of the room 10, and a heater coil 13 on the upstream side thereof with a controlled supply of heat. The exhaust blowers 14 are mounted in the outlet end of the other room 11. The opening 15 forms a circulation passage connecting the rooms 10 and 11 at one end, and the circulation passage 16 connecting the other adjacent ends of the rooms is formed by the external walls 17 having a transverse partition 18 with by-pass dampers 19 for controlling the flow between the adjacent ends of the rooms 10 and 11. Inlet dampers 20 and outlet dampers 21 are provided with the external walls 17 as shown to provide control of the flows therethrough. By a proper operation of these dampers, any portion of the circulating air may be replaced by fresh air from the atmosphere.

The terms "negative house pressure" and "positive house pressure" used in the drawings indicate where the pressures are below or above the outside atmospheric pressure respectively.

The blowers are thus used to circulate the air, provide air flow or velocity in the house, to pass the air over or through the other controlling means, and to supply fresh air. The dampers may be of the 4-way type or separate, as shown in Fig. 1, to regulate whether the air in the house is merely circulated, or all fresh air is supplied, or a mixture of the two is used. The humidifying means may comprise either wet fibrous pads, spray nozzles, slinger discs, or any suitable combinations of these to humidify and cool the air in any well-known manner. For humidifying, the air may be recirculated, while for cooling, fresh air will mainly need to be used. In the later described multiple room systems, humidification can be concentrated at any one or more points in the system, or can be distributed throughout the system. The heating means may be either steam or hot water coils, or a direct fired heater for heating and dehumidifying the air. The heaters may be concentrated in the air passages or may be distributed throughout the house, or both. Also electric or radiant heaters may be used. For some purposes, both heating and humidifying may be required to provide the best climate.

The arrangements here disclosed will provide better indoor climate, on a year round basis, than has been previously possible because of their simplicity and effectiveness.

In Fig. 2 the arrangement is similar but is duplicated at both ends, and the blowers are at the inlet end of each room, supplying a positive house pressure. The four way type of dampers 22 are used, which in their closed position provide recirculation of all the air flow, while in their fully open position, as shown, they provide for complete replenishment of the flow with fresh air from the outside atmosphere at each end.

In Fig. 3, the four way type of damper 22 is used, but only at one end, and the blower is moved into the circulating passage at the other end. The blower could be located anywhere along the flow through the two rooms, as for example at the damper end in either the inlet or outlet passages.

In Fig. 4, a series of four adjacent rooms 23, 24, 25 and 26 are shown, the end rooms 23 and 26 being substantially half as wide as the intermediate rooms 24 and 25. The inlet ends of alternate rooms are on the same side of the building, and these ends of the narrow rooms are connected by circulating passages to the outlets of one of the exhaust fans in the adjacent room ends respectively, while these inlet ends of the wide rooms are connected by circulating passages to the outlets of exhaust fans in the adjacent ends of the rooms on both sides of said inlet ends respectively.

Thus, the inlet ends of the alternate rooms 23 and 25 are on the left side of the building, while those of alternate rooms 24 and 26 are on the right side. The inlet ends of the narrow rooms 23 and 26 are provided with humidifying screens 27 and are connected by circulating passages 29 and 30 to the exhaust of one of the exhaust fans 14 in the adjacent room ends respectively, while the inlet ends of the wide rooms 24 and 25 are provided with humidifying screens 28 and are connected by circulating passages 31 and 32 to the exhausts of the exhaust fans 14 in the adjacent rooms on both sides of said inlet ends respectively.

The present system is designed to control mainly excesses in climatic conditions by economical methods. For example excessive heat is controlled by evaporation of water in the air flowing through the humidifying screens, which is simple and economical rather than by mechanical refrigeration which is not economically feasible nor simple.

The system is able to control within limits, the important climatic factors of: temperature, humidity, air turbulence and velocity, fresh air replenishment, and filtering. The controls on these factors are not entirely independent, it being necessary to humidify the air to cool it, for example. However, in this manner, the extreme conditions normally met in any of these factors can be eliminated.

Fig. 5 represents an arrangement similar to that of Fig. 4, when the multiplicity of rooms is reduced to two. It is one of the simplest arrangements for reasonably controlling practically all the factors mentioned above. Cooling is obtained by increasing humidity, and the air flow is substantially smoothed out at the same time by being sucked through a homogeneous humidifying screen 33 stretched from wall to wall at the inlet ends of the rooms 34 and 35. The suction blowers 36 are at the opposite ends of the rooms and exhaust into passages 37 between the adjacent ends of the rooms. A damper 38 forms a portion of the outer wall of passages 37 when closed, and is axially pivoted so as to gradually close off said passage between the rooms and provide an outlet to the atmosphere for the exhaust fan and an inlet from the atmosphere to the adjacent room. This, of course, reduces the recirculation and increases its replacement by atmospheric air, when and as may be desired. The screens 33 obviously perform also as filters.

Many obvious modifications may be made in these arrangements without departing from the spirit and scope of this invention, as defined in the appended claims.

What is claimed is:

1. An air circulating and conditioning system for enclosures comprising at least two adjacent substantially oblong rooms having outer side walls, inner side walls common to adjacent rooms, and open ends, said open ends comprising end walls having substantial openings therein, interconnecting passages between said openings in at least two adjacent end walls to provide a continuous flow path for the circulation of air through all the rooms, a blower in at least one of said interconnecting passages for inducing said circulation of air, air conditioning means in at least one of the open ends of said rooms, a partition across at least one of said interconnecting passages, said partition having at least one opening and a damper flap cooperating therewith to control the flow through the corresponding passage, and an outer wall of said passage extending in opposite directions from said partition, said outer wall having inlet and outlet openings at opposite sides of said partition respectively, damper flaps cooperating with said inlet and outlet openings, and means for simultaneously opening and closing said inlet and outlet openings in accordance with the closing and opening of said partition flap to maintain a substantially constant total flow circulation of fresh and recirculated air through said system.

2. A circulating and conditioning system as defined in claim 1, comprising two adjacent rooms, said blower being in one of said interconnecting passages and said damper flaps being in the outer wall of the opposite interconnecting passage and thereacross.

3. A circulating and conditioning system as defined in claim 1, comprising two adjacent rooms, said air conditioning means being in the inlet end of at least one of said rooms, and said blower being in the adjacent end of the corresponding interconnecting passage.

4. A circulating and conditioning system as defined in claim 1, comprising two adjacent rooms, said damper flaps comprising at least one damper flap pivotally mounted to close the opening in the partition of said interconnecting passage, and at least one damper flap in the outer wall of said passage for controlling the openings on both sides of said partition and connected for operation with said first flap.

5. A circulating and conditioning system as defined in claim 4, said damper flaps comprising a common single damper flap pivoted in said outer wall at said partition so that as it is turned out of the plane of the openings in said end wall it will progressively close the opening in the partition across said passage.

6. A circulating and conditioning system as defined in claim 1, said air conditioning means extending across the inlet end of each room.

7. A circulating and conditioning system as defined in claim 6, a blower mounted in the end of the interconnecting passage adjacent the other open end of each room.

8. A circulating and conditioning system as defined in claim 7, comprising two adjacent rooms.

References Cited in the file of this patent

UNITED STATES PATENTS

| | | |
|---|---|---|
| 433,094 | Proctor et al. | July 29, 1890 |
| 2,006,109 | Morse | June 25, 1935 |
| 2,121,278 | Babcock | June 21, 1938 |
| 2,137,905 | Church et al. | Nov. 22, 1938 |
| 2,318,027 | Sykes | May 4, 1943 |
| 2,855,839 | Teigen | Oct. 14, 1958 |